(12) United States Patent
Hirai

(10) Patent No.: US 8,554,751 B2
(45) Date of Patent: *Oct. 8, 2013

(54) IMAGE FORMING APPARATUS, METHOD OF CONTROLLING THE IMAGE FORMING APPARATUS, AND STORAGE MEDIUM

(75) Inventor: Nobuyuki Hirai, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/444,174

(22) Filed: Apr. 11, 2012

(65) Prior Publication Data

US 2012/0194848 A1    Aug. 2, 2012

Related U.S. Application Data

(63) Continuation of application No. 12/400,903, filed on Mar. 10, 2009, now Pat. No. 8,176,020.

(30) Foreign Application Priority Data

Mar. 10, 2008   (JP) ................................. 2008-059400

(51) Int. Cl.
   *G06F 17/00*   (2006.01)
(52) U.S. Cl.
   USPC ............ 707/695; 707/694; 707/821; 707/822
(58) Field of Classification Search
   USPC .................................. 707/694, 695, 821, 822
   See application file for complete search history.

(56) References Cited

U.S. PATENT DOCUMENTS

| | | | |
|---|---|---|---|
| 6,182,080 B1 | 1/2001 | Clements | |
| 7,254,593 B2 | 8/2007 | Albornoz et al. | |
| 7,373,365 B2 * | 5/2008 | Varadarajan et al. | 382/306 |
| 7,778,983 B2 * | 8/2010 | Jorden et al. | 707/695 |
| 7,949,692 B2 | 5/2011 | Lemar et al. | |
| 7,952,739 B2 | 5/2011 | Matsumoto | |
| 8,121,985 B2 * | 2/2012 | Krebs | 707/687 |
| 8,266,122 B1 * | 9/2012 | Newcombe et al. | 707/695 |
| 2004/0260693 A1 | 12/2004 | Chen et al. | |
| 2007/0033262 A1 | 2/2007 | Labelle et al. | |
| 2008/0080017 A1 | 4/2008 | Ishizuka et al. | |

FOREIGN PATENT DOCUMENTS

| | | |
|---|---|---|
| JP | 2000-020377 A | 1/2000 |
| JP | 2000-315179 A | 11/2000 |
| JP | 2005-174025 A | 6/2005 |
| JP | 2006-134042 A | 5/2006 |
| JP | 2006352284 A | 12/2006 |

OTHER PUBLICATIONS

Japanese Office Action for corresponding JP 2008-059400, mail date Jul. 24, 2012.

* cited by examiner

*Primary Examiner* — Thanh-Ha Dang
(74) *Attorney, Agent, or Firm* — Rossi, Kimms & McDowell LLP

(57) ABSTRACT

An image forming apparatus which is capable of performing more appropriate control of access to files which grant different access rights on a versions basis. The image forming apparatus is communicably connected to a file server. In a system controller of the image forming apparatus, a reading control section reads an original to thereby generate image data. The reading control section extracts version information on the original from the generated image data. Then, the system controller identifies, out of at least one version of an original file stored in the file server as electronic data corresponding to the original, a version that permits the image forming apparatus to perform image formation, based on the extracted version information on the original.

10 Claims, 14 Drawing Sheets

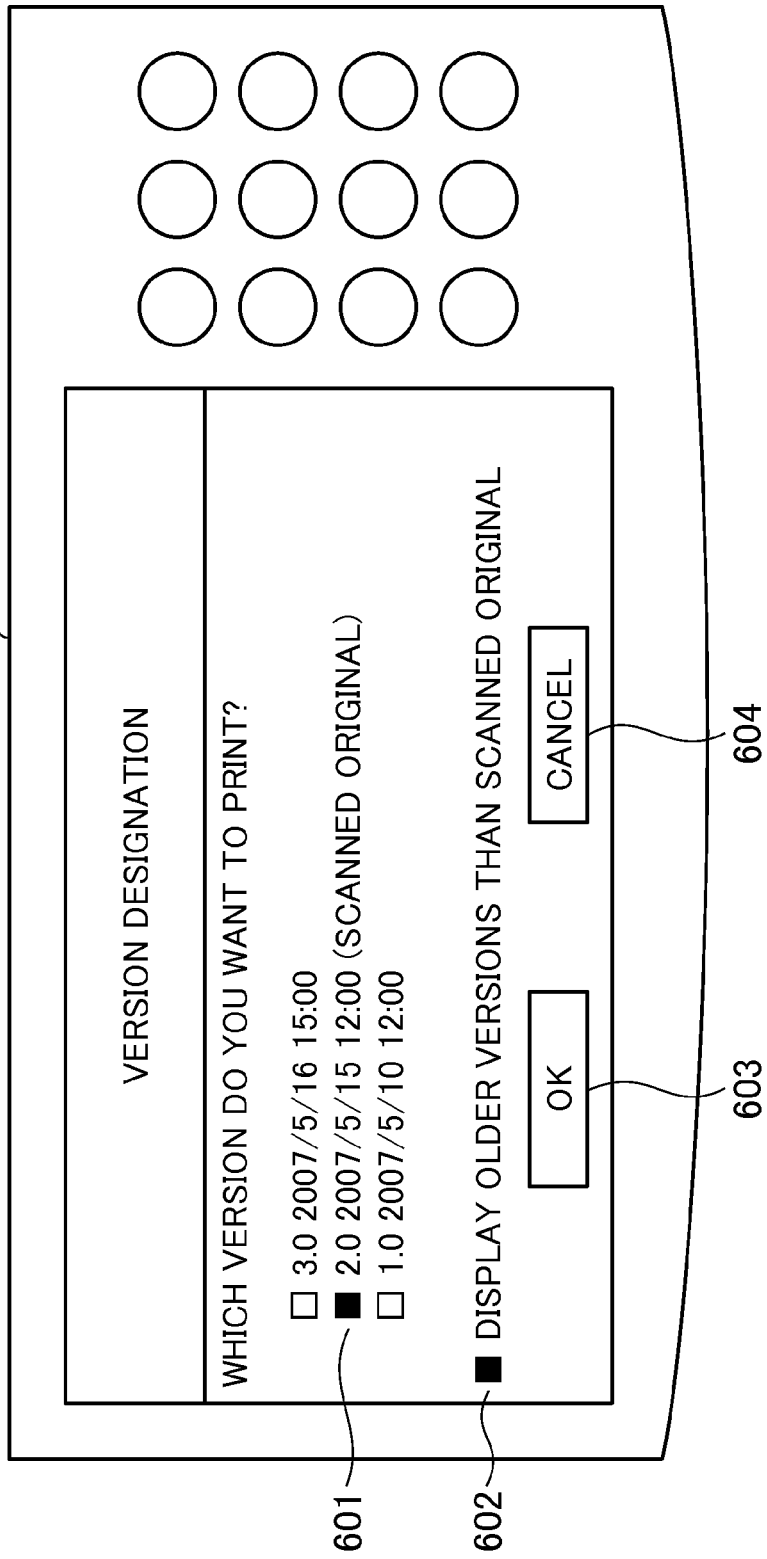

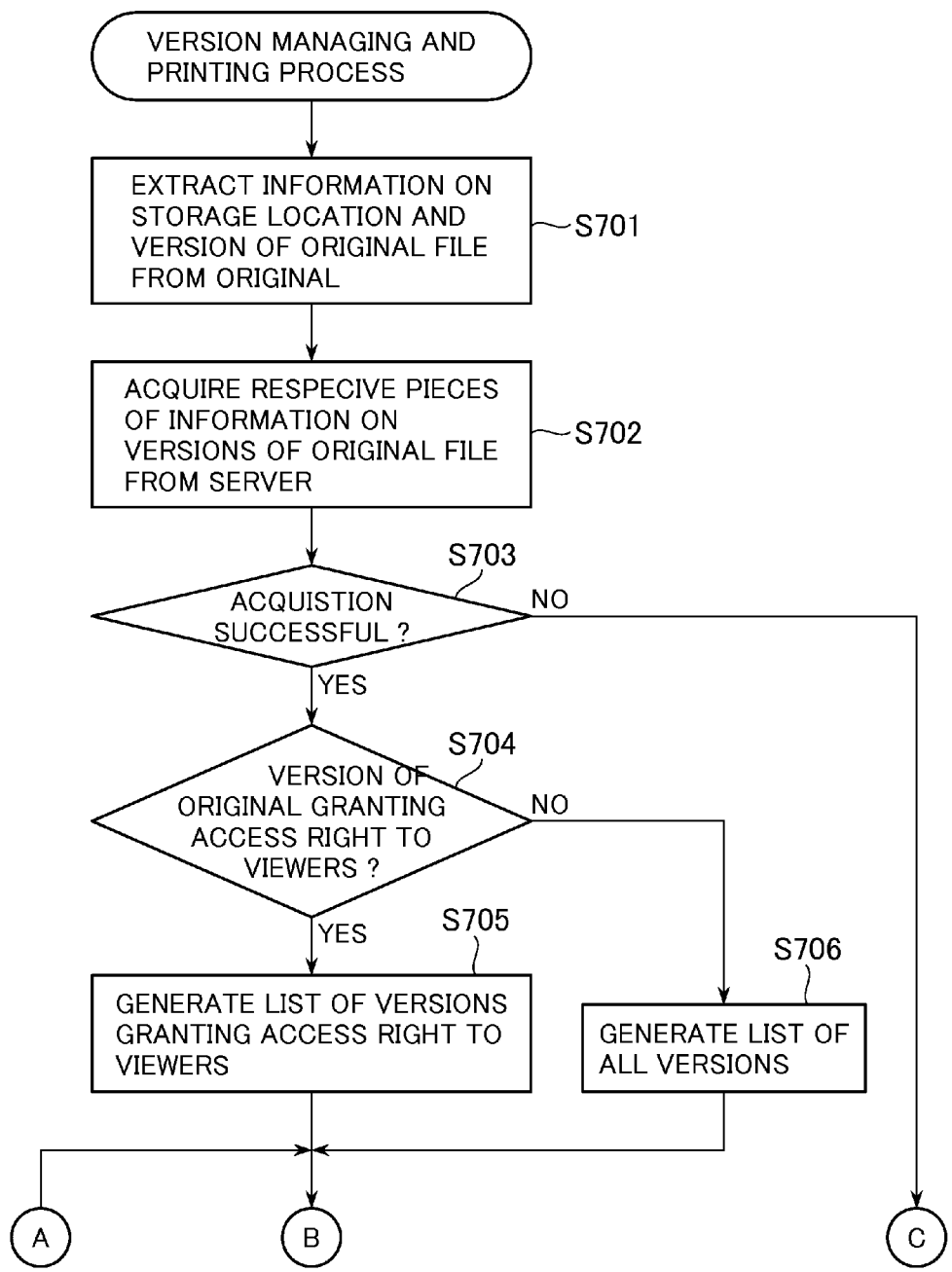

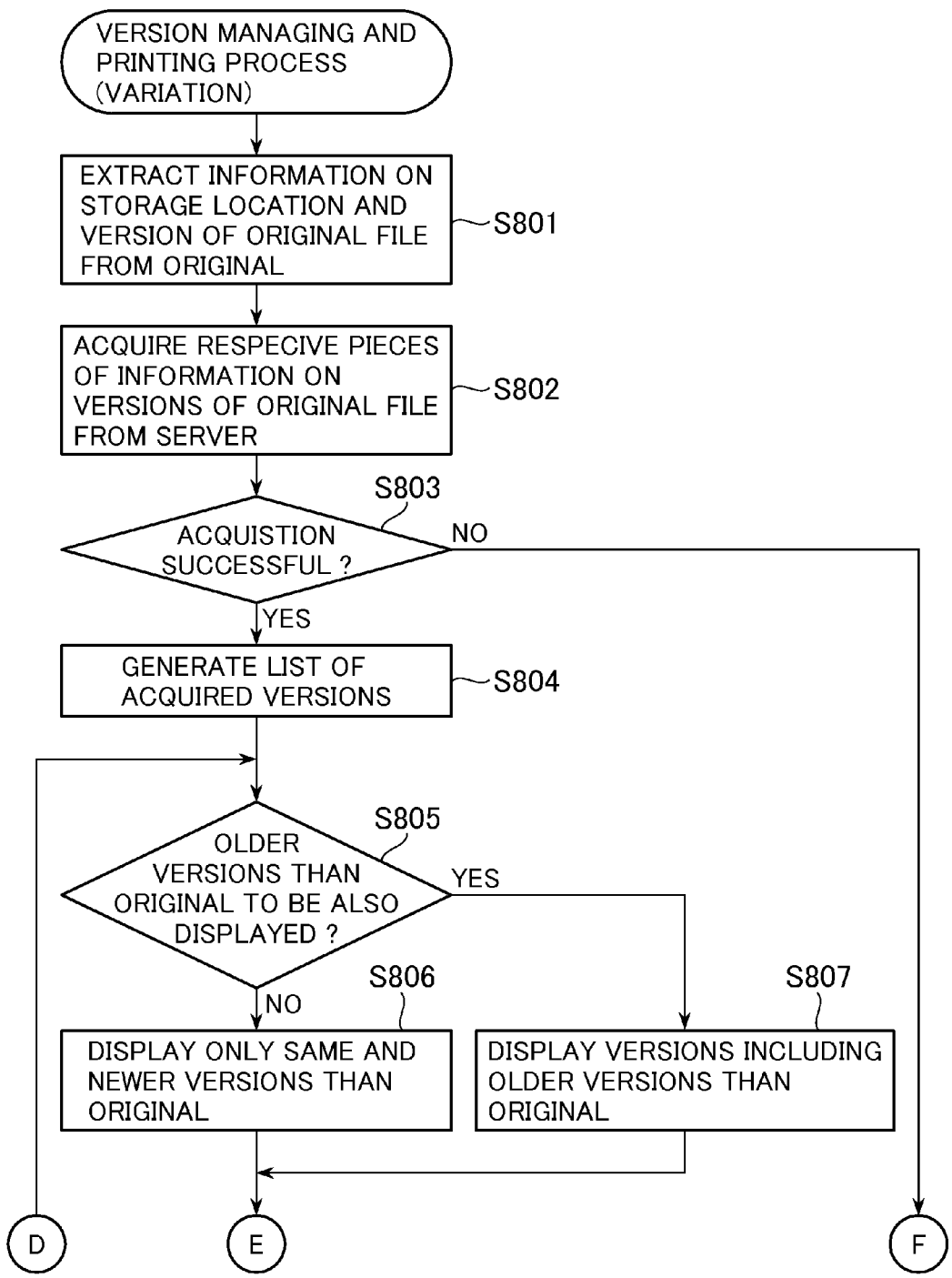

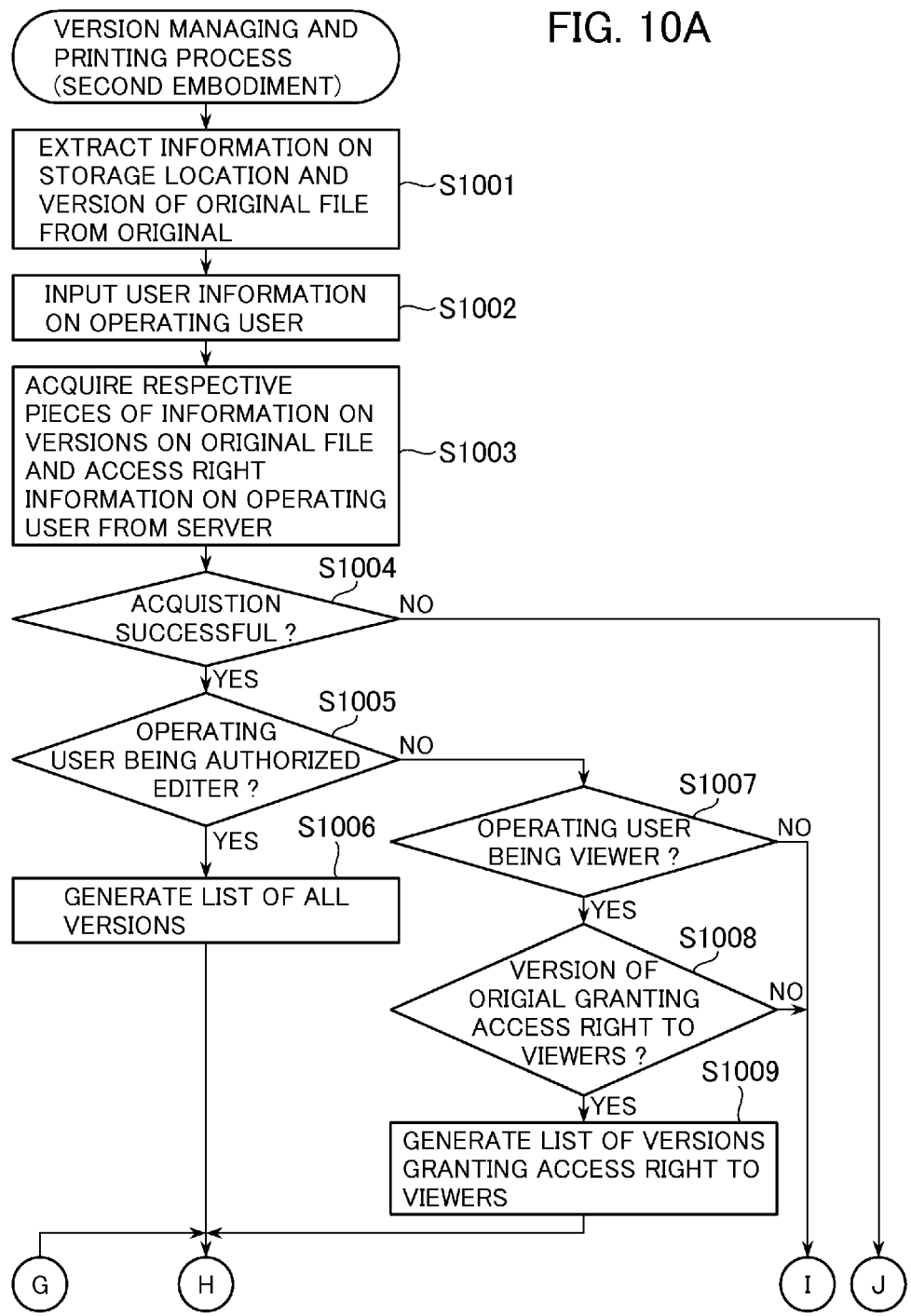

IMAGE FORMING APPARATUS, METHOD OF CONTROLLING THE IMAGE FORMING APPARATUS, AND STORAGE MEDIUM

CROSS-REFERENCE TO RELATED APPLICATION

This application is a continuation of U.S. patent application Ser. No. 12/400,903, filed Mar. 10, 2009, now patented as U.S. Pat. No. 8,176,020, the content of which is incorporated herein by reference.

BACKGROUND OF THE INVENTION

1. Field of the Invention

The present invention relates to an image forming apparatus, a method of controlling the image forming apparatus, and a storage medium, and more particularly to an image forming apparatus characterized by a technique for performing access control to version-controlled files, a method of controlling the image forming apparatus, and a storage medium storing a program for implementing the method.

2. Description of the Related Art

Conventionally, there has been proposed an image forming apparatus that reads an original and extracts information on an original file embedded in the original, and then acquires the original file from a file server to print the same.

There have also been proposed an image forming apparatus that switches processing depending on whether version information also embedded as information on an original file indicates that the original is the latest version (see e.g. Japanese Patent Laid-Open Publication No. 2006-352284).

In this image forming apparatus, if the original is the latest version, the original is immediately copied, whereas if the original is an old version, the latest version is acquired from a file server for printing.

Further, in the image forming apparatus, if the original is the latest version, an original file is acquired from the file server to thereby create a copy with higher image quality, and if the original is an old version, a copy is created with a stamp image indicative of the fact that the copy is an old version.

According to the above-described image forming apparatus, processing is switched depending on whether or not an original is the latest version. For this reason, when the image forming apparatus is applied to a database that performs version control of files and grant different access rights on a version basis, it has been difficult to perform appropriate access control.

SUMMARY OF THE INVENTION

The present invention provides an image forming apparatus which is capable of performing more appropriate control of access to files which grant different access rights on a versions basis, a method of controlling the image forming apparatus, and a storage medium storing a program for implementing the method.

In a first aspect of the present invention, there is provided an image forming apparatus communicably connected to a file server, comprising a reading unit configured to read an original to thereby generate image data, an extraction unit configured to extract version information on the original from the image data generated by the reading unit, and an identification unit configured to identify, out of at least one version of an original file which is electronic data corresponding to the original and is stored in the file server, aversion of the original file that permits the image forming apparatus to perform image formation, based on the version information on the original extracted by the extraction unit.

In a second aspect of the present invention, there is provided a method of controlling an image forming apparatus communicably connected to a file server, comprising reading an original to thereby generate image data, extracting version information on the original from the image data generated by the reading, and identifying, out of at least one version of an original file which is electronic data corresponding to the original and is stored in the file server, a version of the original file that permits the image forming apparatus to perform image formation, based on the version information on the original extracted by the extraction.

In a third aspect of the present invention, there is provided a computer-readable storage medium storing a control program for causing a computer to execute a method of controlling an image forming apparatus communicably connected to a file server, wherein the method comprises reading an original to thereby generate image data, extracting version information on the original from the image data generated by the reading, and identifying, out of at least one version of an original file which is electronic data corresponding to the original and is stored in the file server, a version of the original file that permits the image forming apparatus to perform image formation, based on the version information on the original extracted by the extraction.

According to the image forming apparatus of the present invention, it is possible to perform more appropriate control of access to files which grant different access rights on a version basis.

The features and advantages of the invention will become more apparent from the following detailed description taken in conjunction with the accompanying drawings.

BRIEF DESCRIPTION OF THE DRAWINGS

FIG. 6 is a view of an example of a display screen displayed on a display section of the image forming apparatus in FIG. 2.

FIGS. 7A and 7B are flowcharts of a version managing and printing process executed by the image forming apparatus.

FIGS. 8A and 8B are flowcharts of a variation of the version managing and printing process executed by the image forming apparatus.

FIGS. 10A and 10B are flowcharts of a version managing and printing process executed by an image forming apparatus according to a second embodiment of the present invention.

DETAILED DESCRIPTION OF THE EMBODIMENTS

The present invention will now be described in detail below with reference to the accompanying drawings showing embodiments thereof.

Figure 1:
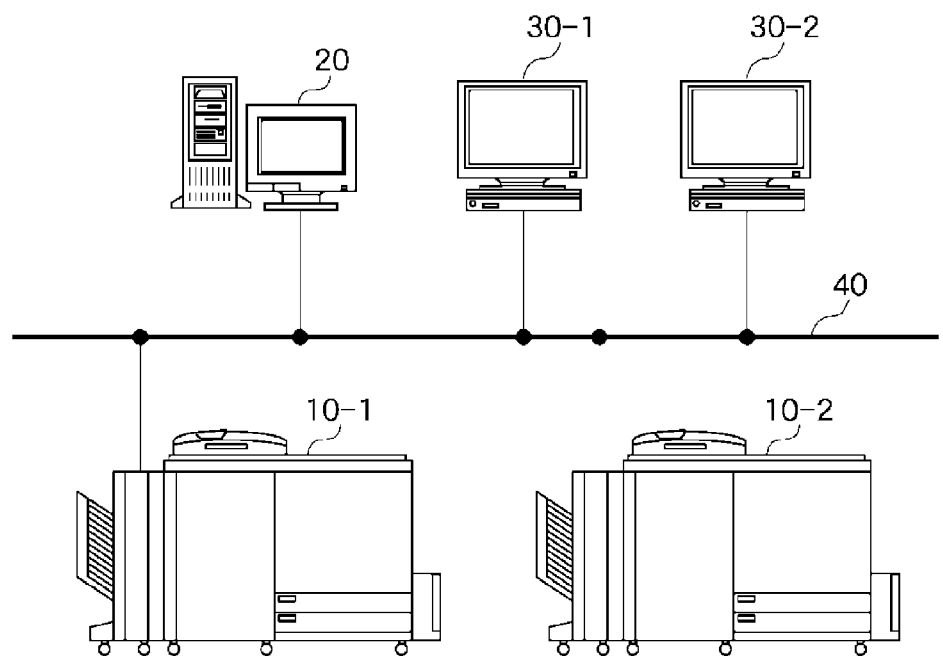
FIG. 1 is a diagram of the configuration of a network system including an image forming apparatus according to a first embodiment of the present invention.

FIG. 1 is a diagram of the configuration of a network system including an image forming apparatus according to a first embodiment of the present invention.

As shown in FIG. 1, the network system is comprised of image forming apparatuses 10 (10-1 and 10-2), a file server 20, and client PCs 30 (30-1 and 30-2), which are communicably interconnected by a network 40.

Each of the image forming apparatuses 10 has various functions, such as a scan function, a print function, and a copy function. The image forming apparatus 10 scans an original and extracts file information embedded in the original, and then acquires information on files corresponding to the original from the file server 20, followed by executing processing corresponding to the acquired information.

The file server 20 manages user information, and files and the like generated by the client PCs 30. The file server 20 is capable of managing the files on a version-by-version basis.

Each of the client PCs 30 is operated by a user for various operations. The user can display, edit, store, print, or perform like processing on files stored in the file server 20 by operating the associated client PC 30.

Figure 2:
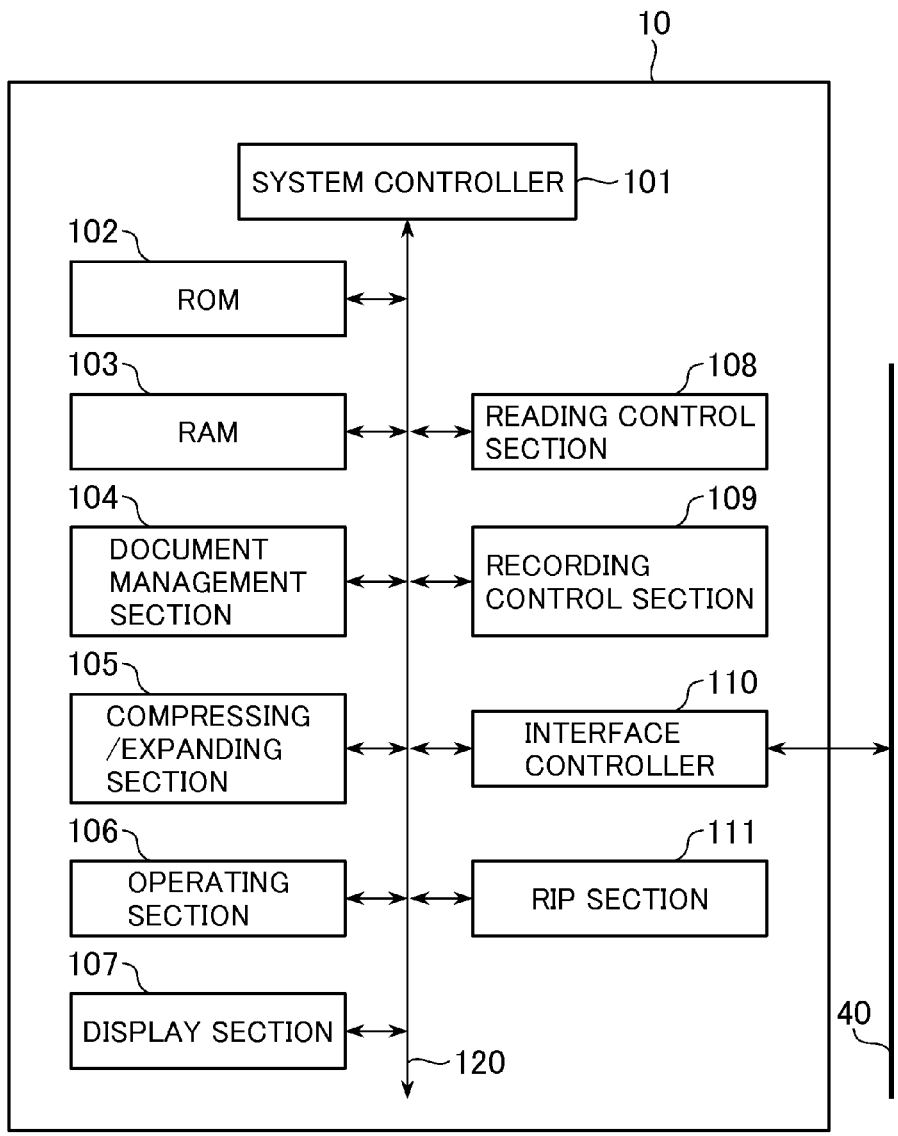
FIG. 2 is a block diagram of the basic configuration of the image forming apparatus appearing in FIG. 1.

FIG. 2 is a block diagram of the basic configuration of the image forming apparatus according to the first embodiment appearing in FIG. 1.

As shown in FIG. 2, a system controller 101 controls the overall operation of the image forming apparatus via a system bus 120.

A ROM 102 stores a control program for the system controller 101, etc. The control program stored in the ROM 102 is executed by a CPU, not shown, of the system controller 101.

A RAM 103 stores setting values registered by an operator and management data on the image forming apparatus. Further, the RAM 103 stores temporary variables and the like.

A document management section 104 is implemented by a hard disk or the like storage device. The document management section 104 is configured to be capable of storing a plurality of image data items, job data items, job management information items, and so forth. For example, image data items from a reading control section 108 and print job data items input via an interface controller 110 can be stored in the document management section 104.

A compressing/expanding section 105 compresses or expands image data. The compressing/expanding section 105 performs processing, such as compression of image data before storing the same in the document management section 104, and inversely, expansion of compressed image data stored in the document management section 104 into an original image data before reading out the same, as required. Further, it is widely known to compress data by JPEG, JBIG, or the like, before transferring the data over a network, and when such compressed data is received by the image forming apparatus 10 via the network 40, the compressing/expanding section 105 decompresses (expands) the compressed data.

An operating section 106 is comprised of various kinds of keys and the like, and the operator carries out various inputs using the operating section 106. A display section (display unit) 107 is implemented e.g. by an LCD or an LED. The display section 107 performs various kinds of displays or voice notifications. If the resolution of the display section 107 is high enough, it is also possible to preview image data stored in the document management section 104 and print out the same after the check preview.

The reading control section (reading unit) 108 includes an image sensor, such as a CCD or a CS, and an image processing controller. The reading control section 108 optically reads an original, converts optically read data into electrical image data, and performs various kinds of image processing, such as color processing, binarization processing, and halftone processing, on the electrical image data to thereby generate high-definition image data.

The reading control section 108 is configured to be capable of executing either or both of the ADF method in which originals placed on an ADF (Automatic Document Feeder) are read by feeding one by one and the platen method in which an original placed on an original platen glass is read without being moved. In the present embodiment, the reading control section 108 also carries out processing for extracting information indicative of a storage location and a version of an original file from the original having the information embedded therein.

A recording control section 109 is implemented by a laser printer or an inkjet printer. The recording control section 109 performs various kinds of image processing, such as smoothing and recording density correction, on image data to be recorded, to thereby convert the image data into high-definition image data, followed by outputting the high-definition image data onto a recording sheet.

The interface controller 110 transmits and receives image data, apparatus information, etc. to and from an information processing apparatus, such as the file server 20, which is connected to the printing apparatus 10 e.g. via a network or a USB. As for a communication control method, it is assumed that a known method is employed, and description thereof is omitted.

A RIP section 111 performs RIP (Raster Image Processing) on PDL data input via the interface controller 110. Further, the RIP section 111 is also capable of storing intermediate data of image data generated by the RIP (Raster Image Processing) or print ready data (bitmap data for printing or compressed data of the bitmap data), as required, in the document management section 104 again.

In the present embodiment, processing for embedding information indicative of a storage location and a version of a file in image data during printing of the file is also carried out by the RIP section 111.

Figure 3:
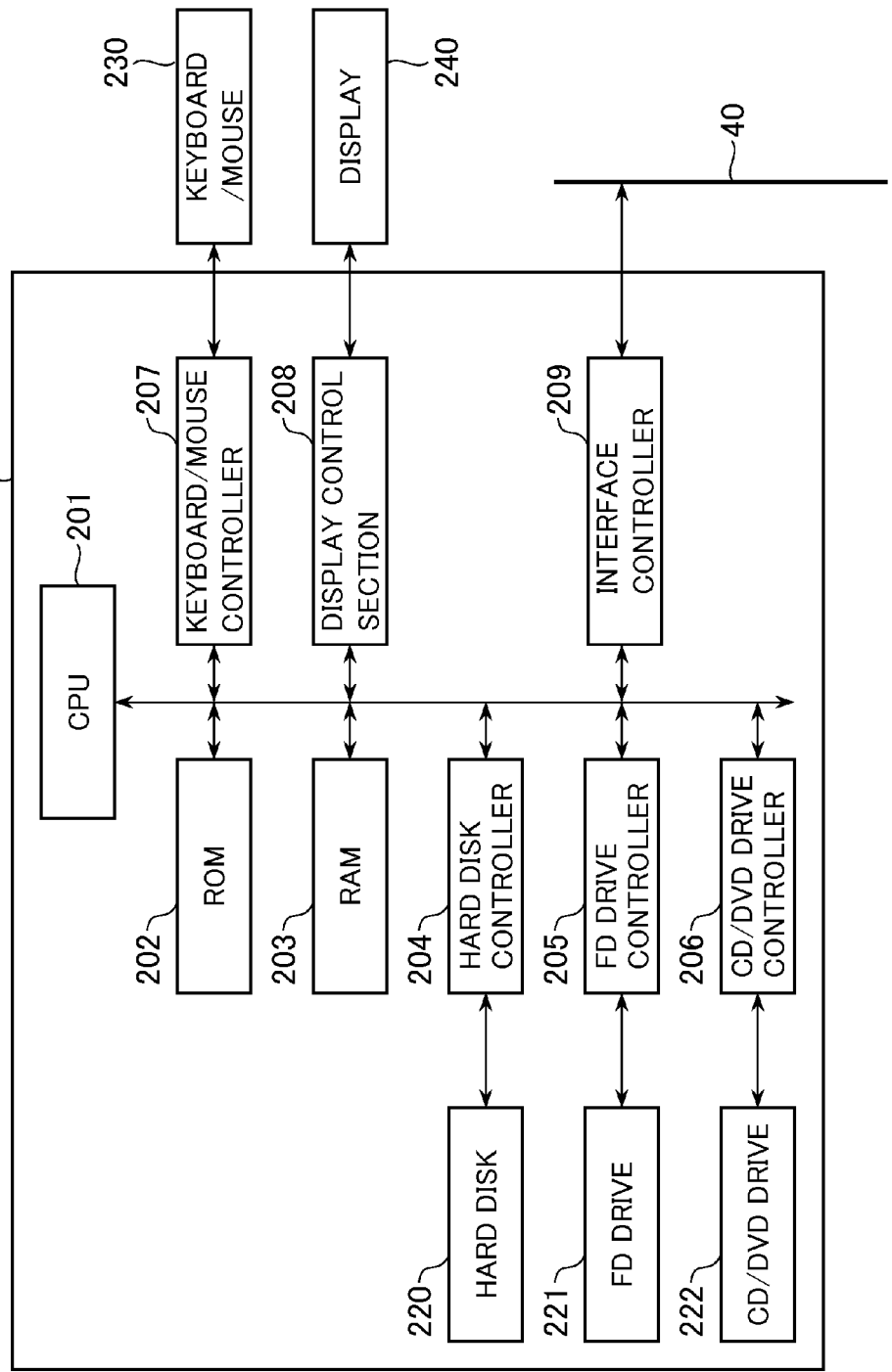
FIG. 3 is a block diagram of the basic configuration of a file server appearing in FIG. 1.

FIG. 3 is a block diagram of the basic configuration of the file server appearing in FIG. 1.

As shown in FIG. 3, a CPU 201 controls the overall operation of the file server according to a program stored in a ROM 202, a RAM 203, or a hard disk 220. Alternatively, the CPU 201 controls the overall operation of the file server according to a program read out from an FD drive 221 or a CD/DVD drive 222.

The ROM 202 stores the control program executed by the CPU 201 and the like. The RAM 203 temporarily stores programs and image data so as to enable the file server 20 to perform high-speed processing.

A hard disk controller 204 controls the hard disk 220. It is assumed that an operating system, various kinds of application software programs, and driver software programs are installed in the hard disk 220, and files, image data, etc. are stored therein.

In general, the application software programs and the driver software programs are installed into the hard disk 220 from other computer-readable media storing the programs e.g. via the FD drive 221 or the CD/DVD drive 222. Alternatively, it is also possible to download the application software programs and the driver software programs via an interface controller 209 and install these into the hard disk 220.

An FD drive controller 205 controls the FD drive 221. A CD/DVD drive controller 206 controls the CD/DVD drive 222.

A keyboard/mouse controller 207 controls a keyboard/mouse 230 used by an operator as an instruction input device for inputting instructions.

A display control section 208 controls a display 240 for performing various kinds of displays for the operator.

The interface controller 209 performs communication with each of external terminal apparatuses, including the image forming apparatuses 10, connected to the file server 20 via the network or the USB. As for a communication control method, it is assumed that a known method is employed, and description thereof is omitted.

It should be noted that each of the client PCs 30 appearing in FIG. 1 may have the same basic configuration as that of the file server 20.

Figure 4:
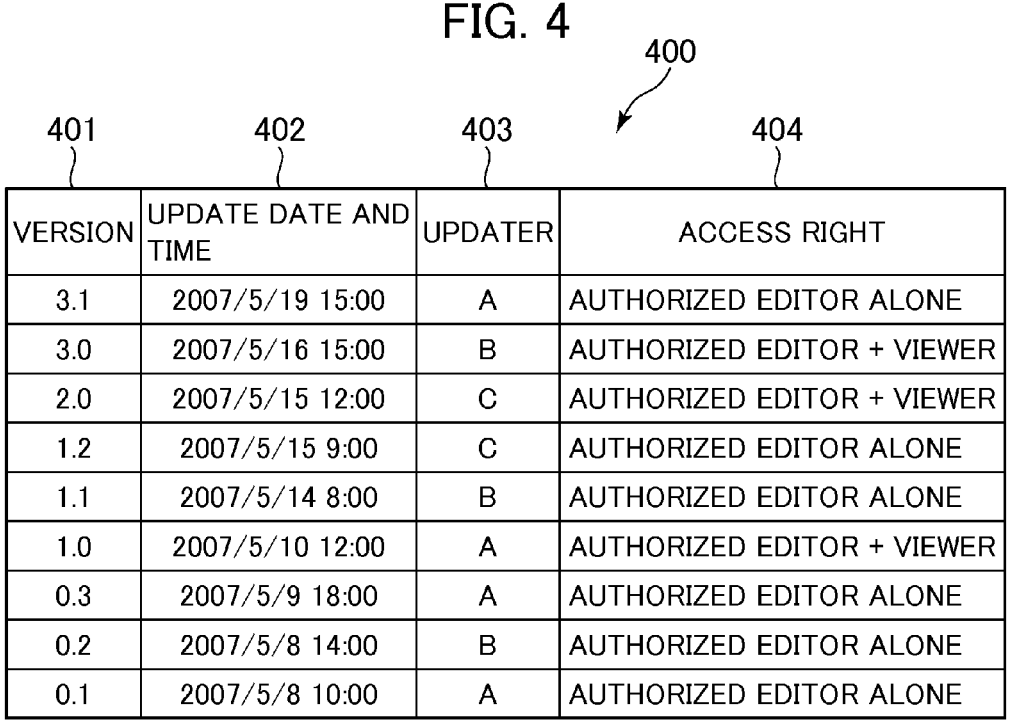
FIG. 4 is a diagram of an example of file version management information stored in the file server.

FIG. 4 is a diagram of an example of file version management information stored in the file server 20.

As shown in FIG. 4, the file version management information (file document information) 400 is stored in the hard disk 220 of the file server 20. The file version management information 400 is generated for each file managed by the file server 20. The file version management information 400 stores information on the versions of files under management, and the information is updated whenever a file is stored or updated.

A version 401 is a piece of version information indicative of a version registered when a file under management is stored. In the present embodiment, pieces of version information are classified into major versions and minor versions. A version whose first decimal digit is equal to 0 is referred to as a major version, while a version whose first decimal digit is not equal to 0 is referred to as a minor version.

An update date and time 402 is indicative of a date and time when a version of a file under management is stored, and an updater 403 is information indicative of the login name of a user who saves the version. An access right 404 is information indicative of a right allowing a user to access the version.

The present embodiment is configured such that each major version can be accessed by both authorized editors and viewers, whereas each minor version can be accessed by the authorized editors alone. For example, when a file is edited by an editor and stored as a minor version 2.1, a viewer is not permitted to access the file. Therefore, the viewer can view only versions 2.0 and 1.0, which are major versions.

In the present embodiment, appropriate access control is performed using the versions 401 and the access rights 404 managed in the file version management information 400.

First, when printing a file managed by the file server 20, information indicative of the storage location and version of the file is sent to the image forming apparatus 10 together with image data.

In the image forming apparatus 10, the RIP section 111 causes the information indicative of the storage location and version of the file to be embedded in the image data, and the recording control section 109 prints out the image data. The embedded information may be visible information, such as a barcode, or alternatively invisible information, such as watermark information. As for the information embedding technique, it is assumed that a known technique is used, and description thereof is omitted.

Thereafter, when the reading control section 108 of the image forming apparatus 10 reads a sheet having the image data printed thereon, as an original, it extracts the information indicative of the storage location and version of the original file embedded in the original. The use of the extracted information makes it possible to perform appropriate access control. This control will be described in detail hereinafter.

Figure 5:
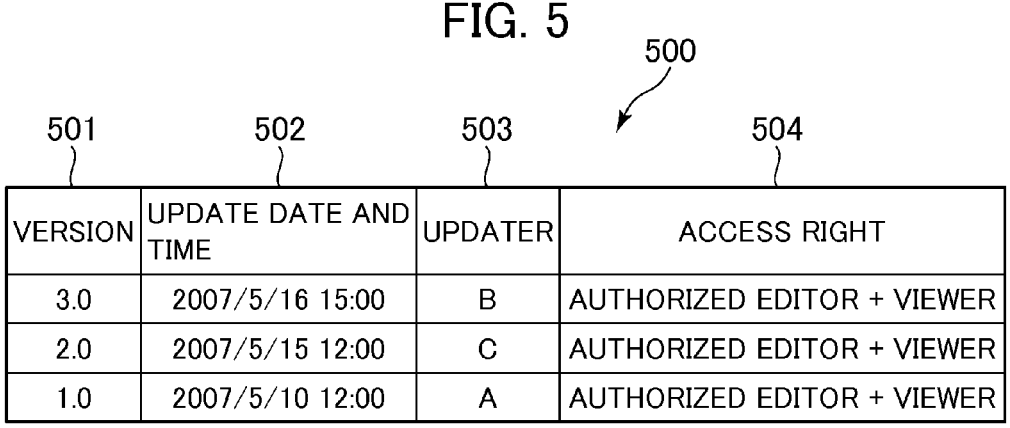
FIG. 5 is a diagram of an example of version list information stored in the image forming apparatus.

FIG. 5 is a diagram of an example of version list information stored in the image forming apparatus.

The version list information 500 is stored in the RAM 103 of the image forming apparatus 10. The version list information 500 is generated by extracting only information on versions which are compatible with an access right to the version of an original read by the image forming apparatus 10, from the file version management information 400.

FIG. 5 shows version list information 500 generated when it is determined that the version of a read original grants an access right to viewers (i.e. the version of the read original is a major version). This determination will be described in detail hereinafter with reference to FIGS. 7 to 8B.

FIG. 6 is a view of an example of a display screen displayed on the display section appearing in FIG. 2.

As shown in FIG. 6, a version list 601 displays a list of pieces of version information which are selected as appropriate ones from those stored in the version list information 500 according to a state of a checkbox 602. By entering a check mark in a checkbox provided before a piece of version information and then pressing an OK button 603, it is possible to give a print instruction to print the version.

The checkbox 602 is used to instruct whether or not to display older versions than that of the scanned original. The checkbox 602 can be switched via the operating section 106.

If the checkbox 602 is checked, the older versions than that of the scanned original are also displayed in the version list 601. On the other hand, if the checkbox 602 is not checked, the older versions than that of the scanned original are not displayed.

In the present embodiment, if the checkbox 602 is not checked, the version 1.0 which is older than that of the scanned original is not displayed. This configuration enables the user to switch whether or not to display older versions than that of a scanned original, thereby contributing to improvement of the usability of the apparatus.

Figure 7B:
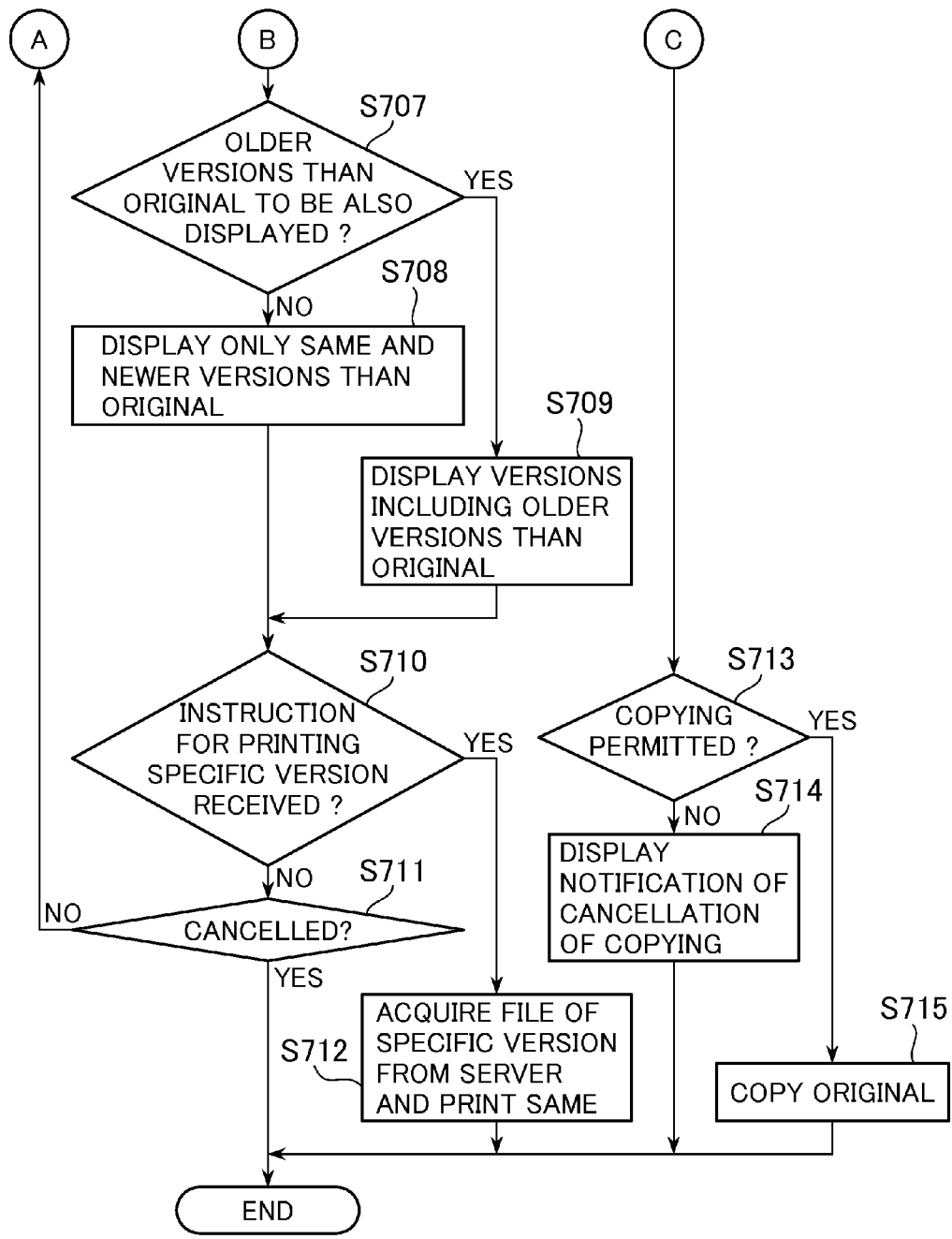

FIGS. 7A and 7B are flowcharts of a version managing and printing process executed by the image forming apparatus according to the present embodiment.

The version managing and printing process is executed under the control of the system controller 101 appearing in FIG. 2.

Referring to FIGS. 7A and 7B, in a step S701, the system controller 101 causes the reading control section 108 to read an original and extract information embedded in the read original, i.e. information on the version of the original and information indicative of a location where a file as electronic data corresponding to the original (hereinafter referred to as the "original file") is stored, and then the process proceeds to a step S702. In the present embodiment, a printout obtained by printing out an original file is referred to as an original.

As mentioned hereinbefore, the embedded information may be visible information, such as a barcode, or alternatively invisible information, such as watermark information.

In the step S702, pieces of version information associated with the original file are acquired from the file server 20, and then the process proceeds to a step S703. Various kinds of information stored in the file version management information 400 in association with the original file can be acquired by passing the information indicative of the storage location of the file, which is acquired in the step S701, to the file server 20.

In the step S703, it is determined whether or not the acquisition of the pieces of version information associated with the original file is successful. If the acquisition is successful, the process proceeds to a step S704. On the other hand, if the acquisition fails e.g. because the file does not exist, the process proceeds to a step S713.

In the step S704, it is determined whether or not the version of the original read in the step S701 grants an access right to viewers i.e. whether or not the version of the read original is a major version. This determination can be performed by referring to the version information extracted in the step S701 and the file version management information 400 acquired in the step S702.

If it is determined that the version of the read original grants an access right to viewers, i.e. if the version of the read original is a major version, the process proceeds to a step S705, whereas if not, i.e. if the version of the read original is a minor version, the process proceeds to a step S706.

In the step S705, a list of versions that grant an access right to viewers is generated. In this step, pieces of version information which are compatible with an access right to the original file corresponding to the version information embedded in the original are extracted from the file version management information 400. More specifically, in the present embodiment, only versions (major versions) that grant an access right to users having a view right are extracted to form the list.

The generated list is stored in the RAM 103 as the version list information 500, which is used in subsequent processing. The version list information 500 illustrated in FIG. 5 is an example generated by extracting only versions that grant an access right to viewers.

In the step S706, a list of all the versions of the original file is generated, and then the process proceeds to a step S707. In the step S706, all the versions are listed from the file version management information 400 acquired in the step S702.

In this case, the same list as shown in the file version management information 400 in FIG. 4 is stored in the RAM 103 as the version list information 500, which is used in subsequent processing.

In the step S707, whether or not to display older versions than that of the scanned original is determined. This determination can be performed e.g. by displaying the user-configurable checkbox 602 as appearing in FIG. 6, together with an instruction "Also display older versions than the scanned original", and determining from a state of the checkbox 602.

If it is determined in the step S707 that the older versions than that of the scanned original are not to be displayed, only information items on the same version as that of the original and newer versions than that of the original are displayed on the display section 107 in a step S708, and then the process proceeds to a step S710.

On the other hand, if it is determined in the step S707 that older versions than that of the original file are also to be displayed, all the pieces of version information in the version list information 500 in the RAM 103 are displayed on the display section 107 in a step S709, and then the process proceeds to the step S710.

In the step S710, it is determined whether or not a print instruction for a specific version is received. This determination can be performed by displaying the version list 601 as appearing in FIG. 6 on the display section 107 and then determining whether or not the user has pressed the OK button 603 via the operating section 106.

If it is determined in the step S710 that the print instruction is received, a designated version, i.e. a version checked in the version list 601, is acquired from the file server 20 in a step S712, and then printing of the designated version is performed, followed by terminating the present process.

Version information on an original and an original file is associated with an access right to the original file.

On the other hand, if it is determined in the step S710 that the print instruction is not received, it is determined in a step S711 whether or not a cancel instruction is received. This determination can be performed by displaying the version list 601 as appearing in FIG. 6 on the display section 107, and then determining whether or not the user has pressed a cancel button 604 via the operating section 106.

If it is determined in the step S711 that the cancel instruction is received, the process is immediately terminated, whereas if not, the process returns to the step S707.

If it is determined in the step S703 that the acquisition of the pieces of version information associated with the original file is not successful, the process proceeds, as mentioned above, to the step S713, wherein it is determined whether or not copying is permitted. Determination as to whether or not to permit copying may be performed according to information unconditionally determined by the image forming apparatus 10, or alternatively may be configured to be changeable via the operating section 106.

If it is determined in the step S713 that copying is not permitted, a notification of cancellation of copying is displayed on the display section 107 in a step S714, followed by terminating the present process. On the other hand, if it is determined in the step S713 that copying is permitted, the original is copied in a step S715, followed by terminating the present process.

Figure 8B:
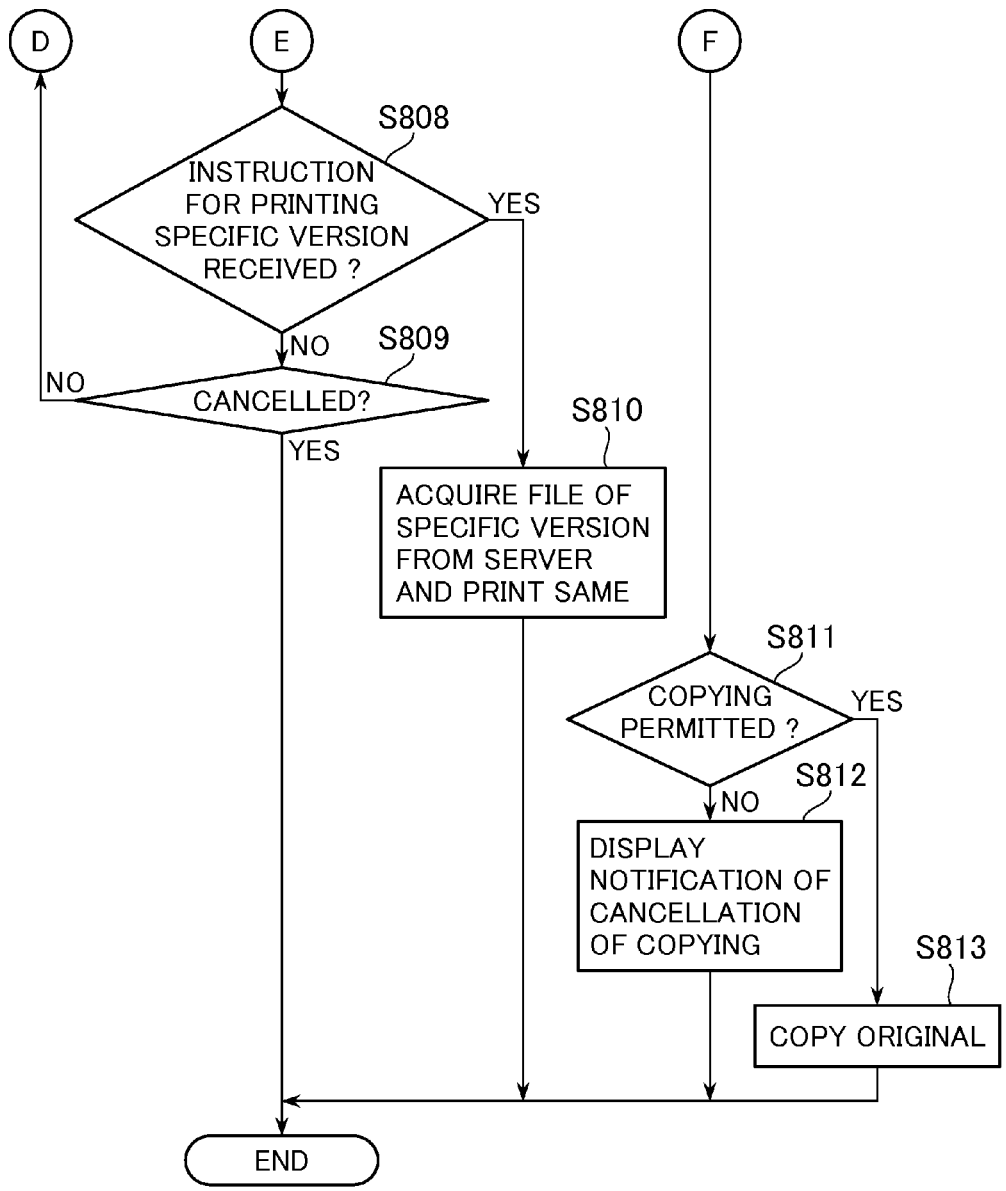

FIGS. 8A and 8B are flowcharts of a variation of the version managing and printing process executed by the image forming apparatus.

The present version managing and printing process is executed under the control of the system controller 101 of the image forming apparatus.

In the present variation, determination as to an access right to the version of the read original, which is performed in the step S704 in FIG. 7A, is performed by the file server 20.

Referring to FIGS. 8A and 8B, in a step S801, the same processing as that in the step S701 is carried out.

In a step S802, version information on the original and information indicative of the storage location of an associated original file, which are extracted (acquired) in the step S801, are sent to the file server 20. Then, as a response to the transmission, pieces of version information corresponding to an appropriate access right selected according to the version of the original are returned from the file server 20. The file server 20 determines whether the version of the original is a major version or a minor version to thereby determine the pieces of version information to be returned as a response.

In a step S803, it is determined whether or not the acquisition of the pieces of version information in the step S802 is successful. If the acquisition is successful, the process proceeds to a step S804. On the other hand, if the acquisition fails e.g. because the file does not exist, the process proceeds to a step S811.

In the step S804, a list of the acquired versions is generated. This is processing for listing the pieces of version information acquired in the step S802, and the generated list is stored in the RAM 103 as the version list information 500 and is used in subsequent processing. Then, the process proceeds to a step S805.

The step S805 to a step S813 are the same as the steps S707 to S715 in FIGS. 7A and 7B.

As described above, according to the present embodiment, it is possible to cause a group of versions each compatible with an access right to the version of a read original to be displayed for selection and printing. This makes it possible to perform more appropriate control of access to files that grant different access rights on a version basis.

Figure 9:
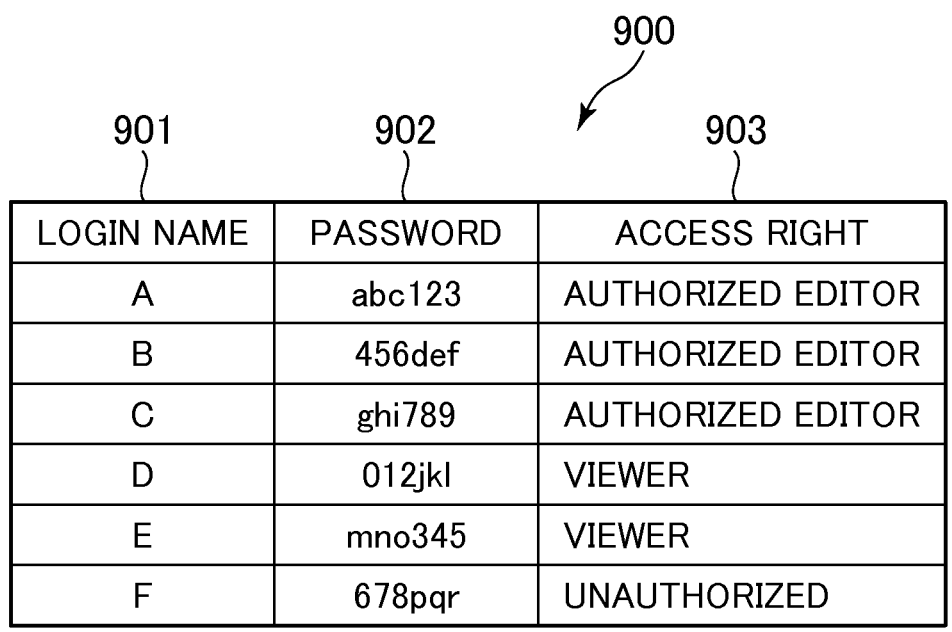
FIG. 9 is a diagram of an example of user management information stored in the file server.

Next, a second embodiment of the present embodiment will be described with reference to FIGS. 9 and 10. The present embodiment is distinguished from the first embodiment only by aversion managing and printing process which is described hereinafter with reference to FIGS. 10A and 10B and in which user management information described below with reference to FIG. 9 is made use of. The other elements in the present embodiment are identical to the corresponding ones in the first embodiment, and therefore description thereof is omitted.

FIG. 9 is a diagram of an example of the user management information stored in the file server 20. The user management information 900 is stored in the hard disk 220 of the file server 20. The user management information 900 stores information on users' access rights to files managed by the file server 20, and the like.

A login name 901 is information on the login name of each user. A password 902 is information on the password of each user. An access right 903 is information on an access right granted to each user. The file server 20 is configured to be capable of controlling access of each login user to files/versions according to information stored in the user management information 900.

Figure 10B:
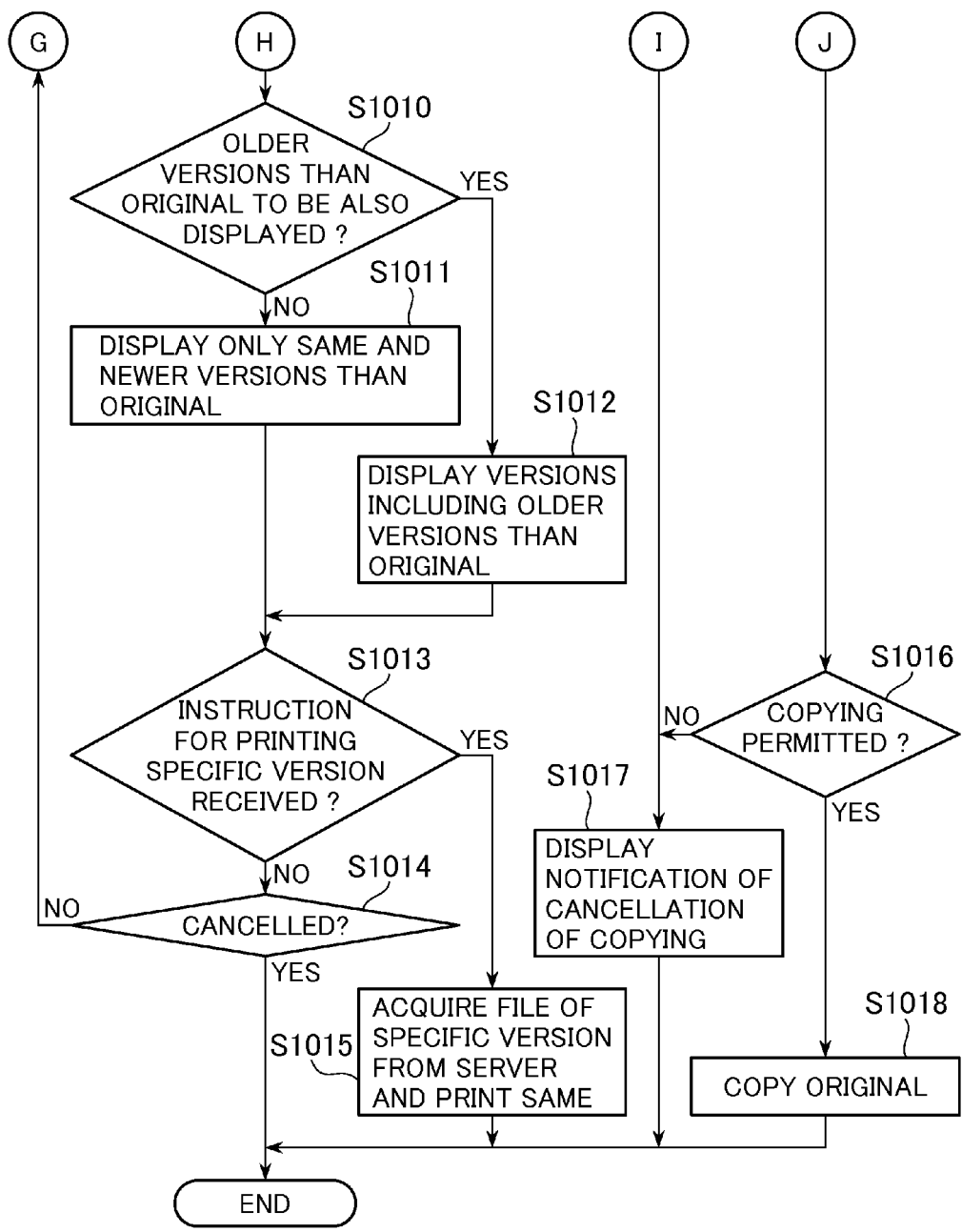

FIGS. 10A and 10B are flowcharts of the version managing and printing process executed by the image forming apparatus according to the present embodiment.

The process of the present flowchart is executed under the system controller 101 of the image forming apparatus.

Referring to FIG. 10A, in a step S1001, from an original read by the reading control section 108, there is extracted information embedded in the original, i.e. information on the version of the original and information indicative of a location where the original file is stored, and then the process proceeds to a step S1002. The information to be extracted may be visible information, such as a barcode, or alternatively invisible information, such as watermark information. As for the information embedding technique, a known technique is used, and hence description thereof is omitted.

In the step S1002, user information on an operating user is entered. This can be realized, for example, by displaying a screen for entering the user's login name and password on the display section 107, and enabling the user's login name and password to be input via the operating section 106. This enables the system controller 101 to identify the operator of the image forming apparatus 10.

It should be noted that the steps S1001 and S1002 may be carried out in reverse order.

In a step S1003, information on the versions of the original file and access right information on the login user are acquired from the file server 20, and then the process proceeds to a step S1004.

The information on the storage location of the original file, which is acquired in the step S1001, is passed to the file server 20, whereby it is possible to acquire various kinds of information stored in the file version management information 400 associated with the file. Further, the user's login name and password entered in the step S1002 are passed to the file server 20, whereby it is possible to acquire the access right information on the user.

In the step S1004, it is determined whether or not the acquisition of the above-mentioned various kinds of information is successful. If the acquisition is successful, the process proceeds to a step S1005. On the other hand, if the acquisition fails e.g. because the associated file does not exist or the entered login name and password do not match information registered in the user management information 900 of the file server 20, the process proceeds to a step S1016.

In the step S1005, it is determined whether or not the operating user is an authorized editor. This determination can be performed based on the access right information associated with the user, which is acquired from the file server 20 in the step S1003. If the operating user is an authorized editor, the process proceeds to a step S1006, whereas if not, the process proceeds to a step S1007.

In the step S1006, a list of all the versions of the original file is generated, and then the process proceeds to a step S1010. In the step S1006, more specifically, all the versions are listed from the file version management information 400 acquired from the file server 20 in the step S1003.

In this case, the same list as shown in the file version management information 400 in FIG. 4 is stored in the RAM 103 as the version list information 500, and is used in subsequent processing.

In the step S1007, it is determined whether or not the operating user is a viewer, i.e. whether or not the user has a view right. This determination can be performed based on the access right information associated with the user, which is acquired from the file server 20 in the step S1003.

If it is determined that the operating user is a viewer, the process proceeds to a step S1008. On the other hand, if it is not determined that the operating user is not a viewer, which means that the user is neither an authorized editor nor a viewer granted a view right, a notification of cancellation of copying due to access right violation is displayed (step S1017), followed by terminating the present process.

In the step S1008, it is determined whether the version of the original read in the step S1001 grants an access right to viewers (having a view right), i.e. whether or not the version of the original is a major version. This determination can be performed by referring to the version information extracted in the step S1001 and the file version management information 400 acquired in the step S1003.

If it is determined that the version of the read original grants an access right to viewers, the process proceeds to a step S1009. On the other hand, if it is not determined that the version of the read original grants an access right to viewers, this means that the operating user does not have an access right to the version of the read original, and hence the notification of cancellation of copying due to access right violation is displayed (step S1017), followed by terminating the present process.

In the step S1009, a list of versions which grant an access right to viewers is generated, and then the process proceeds to the step S1010. In the step S1009, more specifically, only the versions (major versions) which grant an access right to viewers are extracted and listed from the file version management information 400 acquired from the file server 20 in the step S1003.

The generated list is stored in the RAM 103 as the version list information 500, and is used in subsequent processing. The version list information 500 illustrated in FIG. 5 is an example generated by extracting only versions that grant an access right to viewers.

In the step S1010 to a step S1015, the same processing as that in the steps S707 to S712 in FIG. 7B in the first embodiment is executed.

If it is determined in the step S1004 that the acquisition fails, the process proceeds to the step S1016, wherein it is determined whether or not copying is permitted. Determination as to whether or not to permit copying may be performed according to information unconditionally determined by the image forming apparatus 10, or alternatively may be configured to be changeable via the operating section 106.

If it is determined in the step S1016 that copying is not permitted, the notification of cancellation of copying is displayed on the display section 107 in the step S1107, followed by terminating the present process. On the other hand, if it is determined in the step S1016 that copying is permitted, the original is copied in a step S1018, followed by terminating the present process.

Figure 11A:
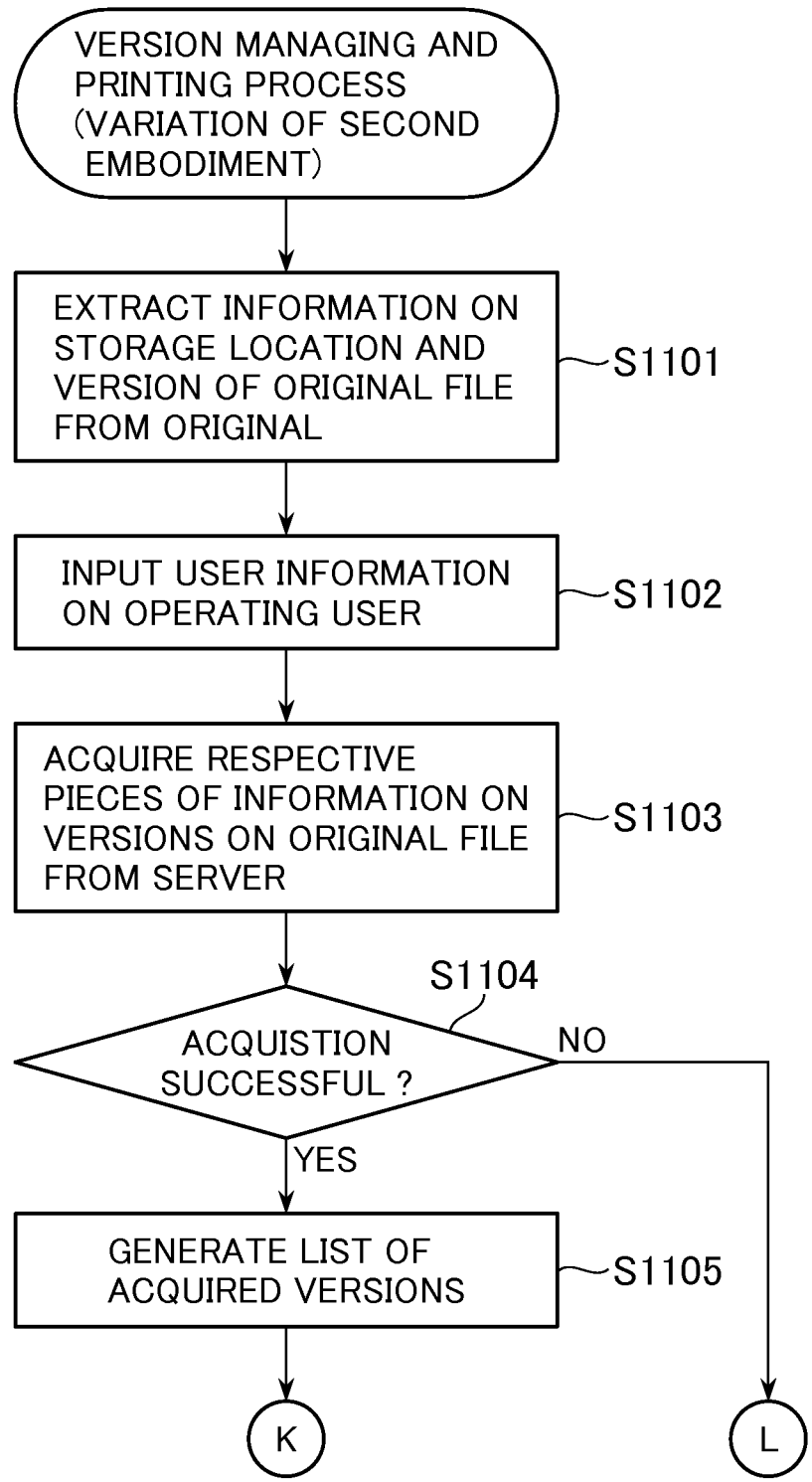
FIGS. 11A and 11B are flowcharts of a variation of the version managing and printing process executed by the image forming apparatus according to the second embodiment.
Figure 11B:
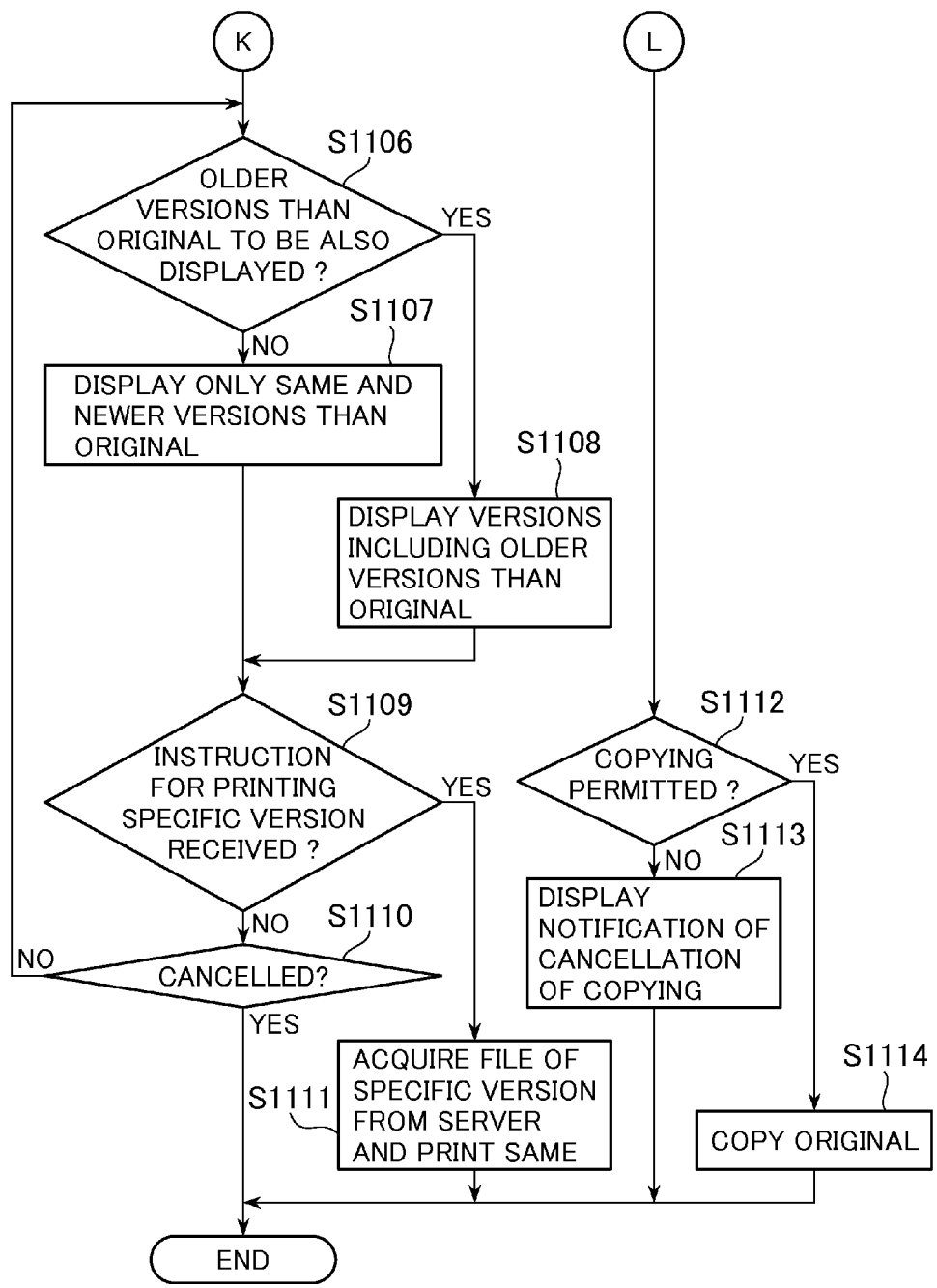

FIGS. 11A and 11B are flowcharts of a variation of the version managing and printing process executed by the image forming apparatus according to the second embodiment.

The present variation is executed under the control of the system controller 101 of the image forming apparatus.

In the present variation, determination as to the access rights, which is performed in the steps S1005, S1007, and S1008 in FIG. 10A, is performed by the file server 20.

In steps S1101 and S1102, the same processing as that in the steps S1001 and S1002 is carried out.

In a step S1103, only pieces of version information corresponding to an appropriate access right are acquired from various pieces of information stored in the file version management information 400 of the file server 20. This can be achieved by passing the information on the storage location of the original file and version of the original, which is acquired in the step S1101, and the user login name and password entered in the step S1102, to the file server 20.

Determination as to the access right can be performed by the file server 20 carrying out the same determination as carried out in the steps S1005, S1007, and S1008 in FIG. 10A.

In a step S1104, it is determined whether or not the acquisition of the pieces of version information corresponding to an appropriate access right for the original file is successful. If the acquisition is successful, the process proceeds to a step S1105. On the other hand, if the acquisition fails e.g. because the associated file does not exist or the entered login name and password does not match information registered in the user management information 900 of the file server 20, the process proceeds to a step S1112.

In the step S1105, a list of the versions acquired from the file server 20 is generated, and then the process proceeds to a step S1106. In the step S1105, more specifically, a list of the versions acquired in the step S1103 is listed, and the generated list is stored in the RAM 103 as the version list information 500, and is used in subsequent processing.

In the step S1106 to a step S1114, the same processing as that in the steps S1010 to S1018 is executed.

As described above, according to the present embodiment, it is possible to execute the processing considering not only an access right associated with the version of a read original but also an access right granted to an operating user, to thereby achieve more fine-grained access control.

It is to be understood that the present invention may also be accomplished by supplying a system or an apparatus with a storage medium in which a program code of software, which realizes the functions of either of the above described embodiments, is stored, and causing a computer (or CPU or MPU) of the system or apparatus to readout and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-059400 filed Mar. 10, 2008, which is hereby incorporated by reference herein in its entirety.

What is claimed is:

1. An image processing apparatus configured to communicate with a file server, comprising:
    an extraction unit configured to extract version information from an image data;
    an identification unit configured to identify, out of at least one version of an original file which is electronic data corresponding to the image data and is stored in the file server, a version of the original file that permits the image processing apparatus to perform image processing, based on the version information on the image data extracted by said extraction unit; and
    a display unit configured to operate when said identification unit identifies a plurality of versions of the original file, to display the plurality of versions of the original file, wherein the display unit displays versions of the original file that are a newer version than the image data, but does not display versions of the original file that are an older versions than the image data.

2. The image processing apparatus according to claim 1, wherein said extraction unit further extracts information for identifying the original file, from the image data, and
    wherein said identification unit transmits the information for identifying the original file extracted by said extraction unit, and the version information on the image data, to the file server, and identifies the version of the original file that permits the image processing apparatus to perform image processing, based on the version information returned from the file server as a response to the transmission.

3. The image processing apparatus according to claim 2, wherein said file acquisition unit acquires an original file of a version selected from the versions displayed on said display unit.

4. The image processing apparatus according to claim 1, further comprising a file acquisition unit configured to acquire an original file of the version identified by said identification unit, from the file server, and an image processing unit configured to perform image processing based on the acquired original file.

5. The image processing apparatus according to claim 1, wherein version information on the image data and the original file are associated with an access right to the original file, and wherein said identification unit identifies a version of the original file, which is compatible with an access right to the original file corresponding to the version information on the image data.

6. The image processing apparatus according to claim 5, further comprising an identifying unit configured to identify a user operating the image processing apparatus, and a determination unit configured to determine an access right of the user identified by said identifying unit to the original file, wherein said identification unit identifies a version of the original file which permits the image processing apparatus to perform image processing, based on the access right of the user identified by said identifying unit to the original file.

7. The image processing apparatus according to claim 6, further comprising a canceling unit configured to operate when the access right to the original file, which is associated with the version information on the image data extracted by said extraction unit, and the access right of the user identified by said identifying unit to the original file are not compatible, to cancel image processing based on the original file.

8. The image processing apparatus according to claim 1, wherein the version information on the original file and the version information on the image data are classified into information on a minor version and information on a major version, and respective access rights are associated with the minor version and the major version.

9. A method of controlling an image processing apparatus configured to communicate with a file server, comprising:

extracting version information from an image data;

identifying, out of at least one version of an original file which is electronic data corresponding to the image data and is stored in the file server, a version of the original file that permits the image processing apparatus to perform image processing, based on the version information on the image data extracted by said extraction; and displaying, when a plurality of versions on the original file are identified, the plurality of versions of the original file;

wherein versions of the original file that are a newer version than the image data are displayed, but versions of the original file that are an older version than the image data are not displayed.

10. A non-transitory computer-readable storage medium storing a control program for causing a computer to execute a method of controlling an image processing apparatus configured to communicate with a file server, wherein the method comprises:

extracting version information from an image data;

identifying, out of at least one version of an original file which is electronic data corresponding to the image data and is stored in the file server, a version of the original file that permits the image processing apparatus to perform image processing, based on the version information on the image data extracted by said extraction; and displaying, when a plurality of versions on the original file are identified, the plurality of versions of the original file;

wherein versions of the original file that are a newer version than the image data are displayed, but versions of the original file that are an older version than the image data are not displayed.

\* \* \* \* \*